United States Patent Office 3,483,152
Patented Dec. 9, 1969

3,483,152
PAINT VEHICLES PREPARED BY TREATING ADDUCTS OF FATTY ACID ESTERS WITH PEROXIDE AND/OR POLYBUTADIENE
Russell R. Koch, Berwyn, Ill., assignor to The Sherwin-Williams Company, Cleveland, Ohio, a corporation of Ohio
No Drawing. Filed Apr. 18, 1966, Ser. No. 543,034
Int. Cl. C08g 17/16, 17/12; C09d 3/64
U.S. Cl. 260—23.7     10 Claims

ABSTRACT OF THE DISCLOSURE

A paint vehicle is prepared by esterifying a resinous polyol with from 5% to 50% excess of an unsaturated fatty acid, reacting the esterified polyol with from 4% to 15% based on the weight of the ester of maleic anhydride or fumaric acid, and reacting the formed adduct with a small amount of either an organic peroxide or polybutadiene or a combination of both. The resultant vehicle is especially useful in making water dispersed coating compositions.

---

The present invention relates to an improved paint vehicle. More particularly, the subject invention is directed to a novel paint vehicle having improved hydrophilicity in addition to other advantageous properties.

In recent years latex paints have enjoyed great success as flat paints. Such products are quick drying and brushes and rollers that are used to apply the paint can be water cleaned. The public acceptance of these products has spurred efforts to produce semigloss or gloss enamel products having the advantages of latex paints. Up to now, however, these efforts have not been entirely successful.

There is a need for pigmented water-soluble or water dispersible vehicles having lower and more stable viscosities, better flow, easier brush and equipment cleanup, better adhesion and water resistance. The principal object of the present invention is to provide a paint vehicle having these properties.

Another object of the invention is to provide gloss or semigloss enamels which have a high water and chemical resistance, which have good covering power, and which can be applied with ease by both professional and nonprofessional painters.

Other objects will become apparent to those skilled in the art from the following detailed description of the invention.

In general, the present invention involves the discovery that maleic anhydride or fumaric acid adducts of esterified polyols can be improved significantly as paint vehicles when these adducts are modified (1) with a polybutadiene, and/or (2) with a peroxide such as cumene hydroperoxide. It has been found, for example, that the addition of a polybutadiene-peroxide combination produces a vehicle having greater hydrophilicity. This change in property is verified by the consistently lower viscosities and greater flow noted with the modified vehicles. Additionally, the equipment used to prepare the water solution as well as the equipment used to apply the pigmented vehicles can be cleaned with water alone.

The modification of the adduct with peroxide improves the drying rate, hardness, and early water resistance of the pigmented vehicle.

The paint vehicles which are treated in accordance with the subject invention are modified derivatives of polyols. The polyols which are to be modified in producing the paint vehicles include homopolymers of 9-oxatetracyclo 4.4.1$^{2,5}$O$^{1,6}$O$^{8,10}$ undecan-4-ol and have the following structural formula:

I 

wherein $n$ is a whole number between 10 and 14, and especially 12, as well as copolymers of styrene and allyl alcohol having the following structural formula:

II 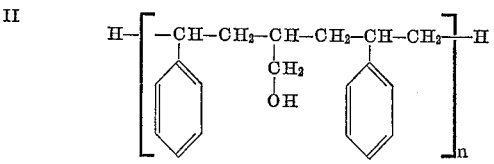

where $n$ is a whole number between 2 and 8. The hydroxyl content of the first named polyol varies between about 11.6% and 12.1%. In preparing the paint vehicle the polyol resin initially is esterified with an unsaturated fatty acid. It is desirable to esterify the available hydroxyl groups of the polyol. For this reason an excess of fatty acid is employed. The amount of fatty acid can range from about 5 to 50% excess, and most often will be at least 10% in excess. Esterification reaction is carried out at a temperature of from about 400° to 550° F., and most often at a temperature of 450°–480° F. In general, a solvent reflux system is employed using xylene, toluene, or the like as an azeotrope to carry off water.

The esterified polyol is subsequently reacted with maleic anhydride or fumaric acid to form a maleic or fumaric adduct. Details with respect to this reaction are set forth below. A small amount of iodine can be used as a catalyst. From about 4 to 15%, and preferably 8 to 12%, maleic anhydride or fumaric acid based on the weight of the ester is used in the reaction. Ordinarily, a glycol ether or a base solution is added to the system after the adduct is formed in order to open the maleic rings. Subsequently, an alkaline material is added to the vehicle to produce a water-soluble or water dispersible product. Lithium hydroxide monohydrate is comonly used as the solubilizing agent but other alkaline materials can be used for this purpose, e.g., ammonia, potassium hydroxide, sodium hydroxide, barium hydroxide, and amines which boil low enough to permit the formation of air dry coatings (for example, dimethylethanolamine, trimethylamine, triethylamine, morpholine, methyl and ethyl morpholines). The alkaline material neutralizes the acid groups of the vehicle forming a salt which produces water solubility or dispersibility.

The second named polyol is esterified, maleinized, and solubilized in the same manner.

Inasmuch as the vehicles have limited water dispersibility, it is desirable to provide a cosolvent during the solubilization step. Examples of suitable cosolvents include:

(a) Low molecular weight alcohols having the general formula R—OH where R can be 1–5 carbon atoms, (b) Monoethers of ethylene glycol having the general formula R—O—CH$_2$CH$_2$—OH where R can be 1, 2 or 4 carbon atoms, (c) Monoethers of 1,3 propane diol having the general formula R—O—CH$_2$—CH$_2$—CH$_2$·OH where R can be ethyl, n-propyl, n-butyl, isobutyl or butoxy ethyl, and (d) Monoethers of diethylene glycol having the general formula R—OCH$_2$CH$_2$O—CH$_2$CH$_2$OH where R can be 1, 2 or 4 carbon atoms.

Subsequently, water is added to produce a product having about 30% to 40% by weight solids, preferably 33% to 35% by weight solids.

The following examples are illustrative of the present invention.

EXAMPLE 1

To a reaction vessel equipped with an inlet for inert gas agitation, a trap for water of reaction, and a temperature recording device, was added 51.7 parts by weight of soya fatty acid and 48.3 parts by weight of resinous polyol No. 2 described above. To this was added 3% by weight xylene as a reflux solvent. The reaction mixture was heated to 480° F. and was held at this temperature until an acid value of from 10 to 17 depending on the hydroxyl content was obtained. The reaction mixture was cooled to 350° F. whereupon 8.25 parts by weight of maleic anhydride and 0.1% iodine based on the formed ester weight dispersed in minimum xylene were added to the reaction mixture. The temperature of the mixture was then raised to 425° F. and held at this temperature for 2 hours to produce an unmodified adduct.

A modified adduct of the present invention was formed by cooling the above reaction mixture to 250° F. whereupon 0.50 part by weight of cumene hydroperoxide and 1 part of stereospecific polybutadiene were added and thoroughly mixed. Ethylene glycol monobutyl ether was then added to obtain 80% solids. The adduct was solubilized in water by adding 13 parts by weight of an additional ethylene glycol monobutyl ether, 3% solubilizing agent (LiOH·$H_2O$) and water to yield a solution at approximately 34% solids.

EXAMPLE 2

In order to test the effectiveness of the combined treatment of the vehicle with a peroxide and polybutadiene, the unmodified adduct from Example 1 was treated with 0.25%, 0.50%, 1.0% and 2.0% cumene hydroperoxide.

TABLE I

| Sample | Clear [1] | Pigmented Original | 10 Days |
|---|---|---|---|
| Unmodified | 144–569″ | 48″ | ([2]) |
| 0.25% cumene hydroperoxide | 390″ | 28.0″ | 35″ |
| 0.50% cumene hydroperoxide | 345″, 668″, 978″ | 27.0″ | 42″ |
| 1.0% cumene hydroperoxide | 606″ | 39.4″ | 46″ |
| 2.0% cumene hydroperoxide | 400″ | 15.2″ | 27″ |
| 0.5% cumene hydroperoxide, 1% polybutadiene | 323″–692″ | 10–16″ | ([3]) |

[1] Gardner-Holt seconds (80% solids).
[2] Too heavy.
[3] No significant change.

As is apparent from the table, the viscosity increased upon aging, the 1% cumene hydroperoxide level showing the highest viscosity increase. In contrast, the cumene-polybutadiene modified vehicle showed good stability and consistency in the pigmented system.

EXAMPLE 3

A maleic adduct prepared as shown in Example 1 was modified with various quantities of cumene hydroperoxide and polybutadiene prior to the addition of ethylene monobutyl ether. Various properties of the vehicles are set out in Table II.

TABLE II

| Sample | | Clear | | | Pigmented |
|---|---|---|---|---|---|
| Peroxide, percent | Polybutadiene | Tack free, hr. | Kraft free, hr. | Foil free, hr. | Water resistance (64) hr. |
| None | None | 4.00 | 7.00 | 8.50 | Poorest. |
| 0.25 | do | 5.25 | 6.33 | 7.33 | Slight blisters. |
| 0.50 | do | 5.25 | 6.33 | 7.33 | No blisters. |
| 1.0 | do | 3.00 | 4.75 | 7.25 | Do. |
| 2.0 | do | 3.00 | 4.75 | 6.50 | Do. |
| 0.5 | 1.0% | 5.75 | 6.50 | 8.75 | Do. |
| 0.5 | 5.0% | 5.50 | 6.25 | 8.75 | Do. |
| None | 1.0% | 5.75 | 6.50 | 9.00 | Swelled. |

As is apparent from the table, the drying time decreases with the addition of cumene hydroperoxide alone, whereas the peroxide and polybutadiene treatment combined provides a drying time which is comparable to that of the unmodified vehicle. The water resistance is good for both the combination and for the peroxide alone.

EXAMPLE 4

In this experiment an adduct was prepared as shown in Example 1 with a 0.5% cumene hydroperoxide modification. A portion of the vehicle at 80% solids was further modified at room temperature with 1% stereospecific polybutadiene. A water solution was then prepared as is desired in Example 1. The portion of the vehicle which was not modified with polybutadiene was solubilized in water. One (1%) percent polybutadiene was then added to the solution and mixed until a homogeneous material resulted.

Drying tests and vehicle characteristics of both of the vehicles showed that they were similar to the vehicle prepared as described in Example 1.

EXAMPLE 5

An unmodified adduct was prepared as shown in Example 1 except that safflower fatty acid was substituted for the soya fatty acid. A second adduct was prepared with safflower fatty acid and was modified as described in Example 1. The modified vehicle showed improvement in properties over the corresponding unmodified vehicle similar to that observed with adducts prepared using soya fatty acid.

EXAMPLE 6

In this example tall oil fatty acid containing 1.0–1.5% rosin acids were substituted for soya fatty acid in preparing modified and unmodified adducts as described in Example 1. An improvement was observed with the peroxide-polybutadiene modified vehicle which was comparable to the improvement noted with the soya fatty acid vehicle.

To the reaction vessel described in Example 1 were added 68.6 parts of soya fatty acid and 31.4 parts of resinous polyol No. 1 described above. The reactants were heated to 450° F. and held at that temperature until the desired acid value was obtained (from about 10 to 16). An unmodified adduct and a corresponding peroxide-polybutadiene modified adduct were prepared as described in Example 1. The modified vehicle had much improved properties.

By practicing the subject teaching and modifying the vehicle in the manner described, improved flow, viscosity, brush washout, and adhesion properties are obtained. When a paint formulation is prepared containing the modified vehicle improved reverse impact resistance is obtained over the formulation containing the unmodified vehicle.

The peroxide should be added to the reaction mixture at a safe temperature. Cumene hydroperoxide should be added to the reaction mixture at a temperature from 150°–300° F., preferably 200°–275° F. The polybutadiene addition is not dependent on temperature for good results. The polybutadiene, for example, can be added at a temperature varying from room temperature to 400° F. or more. Once the peroxide has been added, the temperature of the polybutadiene addition becomes dependent upon the safe temperature of the peroxide.

As was pointed out above, the polyol resin is esterified with an excess of an unsaturated fatty acid. The excess amount of fatty acid can range from about 5 to 50% excess. The fatty acids can be those contained in soybean oil, safflower oil, linseed oil, dehydrated castor oil, cotton seed oil, tall oil, and the like. Specific fatty acids include oleic acid, linoleic acid, linolenic acid, and the like. The polyols are generally esterified at temperatures of from about 400° to 550° F., and most often at a temperature of about 450° to 480° F. Rosin acids are difficult to esterify below 500° F. For this reason if a tall oil is used having a high rosin content a temperature in excess of 500° F. will be needed in most instances.

The ester is liquid at ordinary temperatures. The ester containing some retained solvent (e.g., 3.5% xylene) will have a viscosity of from about 15 to 400 poises at 77° F., and preferably will have a viscosity of from about 50 to 200 poises at 77° F.

The modified maleinized or fumarized ester can be dissolved in a water-insoluble organic solvent (e.g., xylene or mixtures containing mineral spirits) to produce a coating composition which can be applied to objects made of steel or other metal and dried by baking in a conventional manner. Driers, for example, cobalt naphthenate, can be added to facilitate drying and to provide compositions which will dry to touch at lower temperatures or at ordinary room temperatures and can be applied to wood, plaster or other surfaces.

The invention is particularly important, however, in the preparation of water dispersed coating compositions of the type previously described which can be applied to many different types of surfaces, including metal, wood, and plaster.

An improvement is noted where either the peroxide or butadiene is used alone and the invention is meant to encompass separate use of these modifying agents. It is preferred, however, that the combination of peroxide and polybutadiene be used to improve the properties of the maleinized adduct.

In addition to resinous polyols described above, the process can be used to modify any other polyols that have been esterified and maleinized for the preparation of a paint vehicle.

The polybutadiene that is used in the process generally will have a molecular weight of from about 6,000 to about 12,000 and preferably from about 8,000 to 10,000. The polybutadiene is normally liquid. A preferred modifying agent is stereospecific polybutadiene having a similar molecular weight. Any of the foregoing coating compositions can be prepared with or without pigments.

Although the peroxide used in the above examples was cumene hydroperoxide, other peroxides can be used in practicing the invention. Such other peroxides include methyl ethyl ketone peroxide, dicumyl peroxide, and benzoyl peroxide.

The amount of peroxide used to treat the maleic adduct can vary from about 0.25 to 5.0%, and preferably from about 0.5 to about 2.0%, based on the weight of the adduct. The amount of polybutadiene employed in the process will vary from about 0.5 to about 7.0%, and preferably from about 0.5 to about 2.0%, based on the weight of the adduct.

EXAMPLE 7

This example illustrates a water soluble enamel which includes the modified paint vehicle prepared as shown in Example 1.

| | Lbs. |
|---|---|
| Titanium dioxide | 300 |
| Kaolin | 100 |
| Tetrapotassium pyrophosphate | 2 |
| Sodium pentachlorophenate | 2 |
| Water | 115 |
| Modified paint vehicle | 500 |
| Cobalt isodecanoate | 4 |
| Lead isodecanoate | 4 |
| Zinc naphthenate | 10 |
| Methylethyl ketoxime | 2 |
| Water | 40 |

The above enamel had excellent water resistance, good covering power, and the brushes and rollers used to apply the enamel were water washable.

As is explained above, the treatment of the paint vehicle with an organic peroxide and with polybutadiene individually improves many of the properties of the vehicle. The combined treatment of the vehicle with the peroxide and polybutadiene, however, provides an even superior product.

Obviously, many modifications and variations of the invention as hereinbefore set forth may be made without departing from the spirit and scope thereof, and therefore only such limitations should be imposed as are indicated in the appended claims.

I claim:
1. A process for producing a paint vehicle which comprises: esterifying a resinous polyol from the class consisting of resinous polyols having the following structural formulae:

I
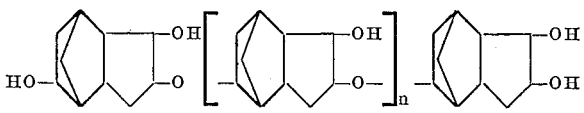

wherein $n$ is 10 to 14, and

II
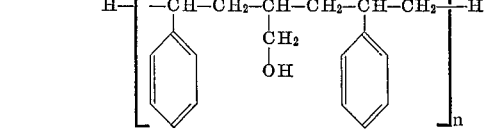

wherein $n$ is 2 to 8, with from about 5 to 50% excess of an unsaturated fatty acid, reacting the esterified polyol with from about 4 to 15% of a member selected from the group consisting of maleic anhydride and fumaric acid based on the weight of the ester, and thereafter reacting the formed adduct with 0.25% to 5.0% by weight of an organic peroxide.

2. A process for producing a paint vehicle which comprises: esterifying a resinous polyol from the class consisting of resinous polyols having the following structural formulae:

I
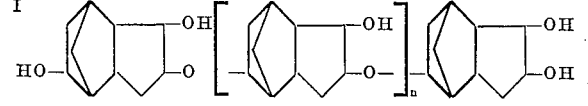

wherein $n$ is 10 to 14, and

II
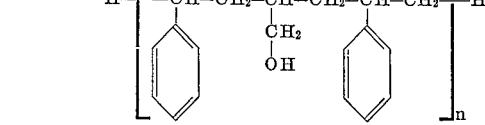

wherein $n$ is 2 to 8, with from about 5 to 50% excess of an unsaturated fatty acid, reacting the esterified polyol with from about 4 to 15% of a member selected from the group consisting of maleic anhydride and fumaric acid based on the weight of the ester, and thereafter reacting the formed adduct with 0.5% to 7.0% by weight of normally liquid polybutadiene.

3. A process for producing a paint vehicle which comprises: esterifying a resinous polyol from the class consisting of resinous polyols having the following structural formulae:

I
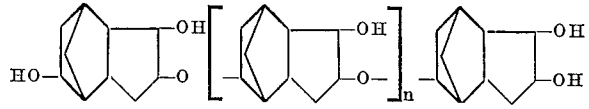

wherein $n$ is 10 and 14, and

II

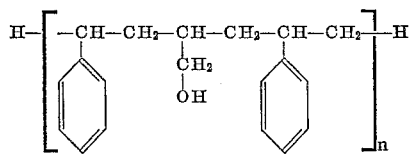

wherein $n$ is 2 to 8, with from about 5 to 50% excess of an unsaturated fatty acid, reacting the esterified polyol with from about 4 to 15% of a member selected from the group consisting of maleic anhydride and fumaric acid based on the weight of the ester, and thereafter reacting the formed adduct with 0.25% to 5.0% by weight of an organic peroxide and with 0.5% to 7.0% by weight of normally liquid polybutadiene.

4. A process as in claim 1 wherein the organic peroxide is cumene hydroperoxide.

5. A process as in claim 3 wherein the organic peroxide is cument hydroperoxide.

6. A process as in claim 3 wherein the amount of organic peroxide, based on the weight of the adduct, varies from about 0.5% to about 2.0%, and wherein the amount of polybutadiene, based on the weight of the aduct, varies from about 0.5% to about 2.0%.

7. The paint vehicle produced by the process of claim 1.

8. The paint vehicle produced by the process of claim 2.

9. The paint vehicle produced by the process of claim 3.

10. The paint vehicle produced by the process of claim 6.

References Cited

UNITED STATES PATENTS

| | | | |
|---|---|---|---|
| 3,392,129 | 7/1968 | Hoy et al. | 260—22 |
| 3,251,790 | 5/1966 | Christenson et al. | 260—18 |
| 3,297,557 | 1/1967 | Huggard | 204—181 |
| 3,341,485 | 9/1967 | Long | 260—18 |

DONALD E. CZAJA, Primary Examiner

R. A. WHITE, Assistant Examiner

U.S. Cl. X.R.

260—18, 23, 29.2, 29.6, 29.7, 37, 41, 41.5